(12) United States Patent
Musawi et al.

(10) Patent No.: US 11,434,132 B2
(45) Date of Patent: Sep. 6, 2022

(54) PROCESS AND MEANS FOR DECOMPOSITION OF SOUR GAS AND HYDROGEN GENERATION

(71) Applicant: SAUDI ARABIAN OIL COMPANY, Dhahran (SA)

(72) Inventors: Maytham Musawi, Alhasa (SA); Aadesh Harale, Dhahran (SA); Mourad Younes, Dhahran (SA)

(73) Assignee: SAUDI ARABIAN OIL COMPANY

( * ) Notice: Subject to any disclaimer, the term of this patent is extended or adjusted under 35 U.S.C. 154(b) by 474 days.

(21) Appl. No.: 16/569,136

(22) Filed: Sep. 12, 2019

(65) Prior Publication Data

US 2021/0078861 A1    Mar. 18, 2021

(51) Int. Cl.

| C01B 3/48 | (2006.01) |
|---|---|
| B01D 53/52 | (2006.01) |
| B01D 53/81 | (2006.01) |
| C01B 3/24 | (2006.01) |
| C01F 11/06 | (2006.01) |

(52) U.S. Cl.
CPC .............. *C01B 3/48* (2013.01); *B01D 53/52* (2013.01); *B01D 53/81* (2013.01); *C01B 3/24* (2013.01); *C01F 11/06* (2013.01); *B01D 2251/404* (2013.01); *B01D 2257/304* (2013.01); *C01B 2203/0233* (2013.01); *C01B 2203/0272* (2013.01); *C01B 2203/0283* (2013.01); *C01B 2203/062* (2013.01); *C01B 2203/1241* (2013.01); *C01B 2203/1258* (2013.01)

(58) Field of Classification Search
CPC .................................. C01B 3/48; B01D 53/52
USPC ...................................................... 423/648.1
See application file for complete search history.

(56) References Cited

U.S. PATENT DOCUMENTS

| 4,579,070 A | 4/1986 | Lin et al. |
| 4,741,819 A | 5/1988 | Robinson et al. |
| 4,880,439 A | 11/1989 | Najjar et al. |
| 5,520,798 A | 5/1996 | Innes |
| 6,797,253 B2 | 9/2004 | Lyon |
| 7,001,586 B2 | 2/2006 | Wang et al. |
| 7,682,597 B2 | 3/2010 | Blumenfeld et al. |

(Continued)

FOREIGN PATENT DOCUMENTS

| CN | 103552983 A | 2/2014 |
| EP | 1060123 A1 | 12/2000 |

(Continued)

OTHER PUBLICATIONS (SA51103) International Search Report and Written Opinon of PCT Application No. PCT/US2020/050543 dated Dec. 3, 2020: pp. 1-15.

(Continued)

*Primary Examiner* — Douglas B Call
(74) *Attorney, Agent, or Firm* — Bracewell LLP; Constance Gall Rhebergen

(57) ABSTRACT

Integrated refinery processes and systems for generating hydrogen by direct decomposition of hydrocarbons. The integrated processes and systems can be used to capture carbon and sulfur in solid form, reducing carbon dioxide and sulfur oxide emissions. The processes include reacting sour gas with a metal-based sorbent in a reactor to produce sulfur-bearing solids and water, and to partially reform hydrocarbons in the sour gas to produce hydrogen-rich syngas; and cracking remaining hydrocarbons thermally with or without the presence of a catalyst to produce hydrogen and solid carbon.

19 Claims, 2 Drawing Sheets

(56) References Cited

U.S. PATENT DOCUMENTS

| | | |
|---|---|---|
| 8,562,933 B2 | 10/2013 | Andrus, Jr. et al. |
| 9,810,146 B2 | 11/2017 | Hoteit et al. |
| 2009/0263316 A1 | 10/2009 | Lyer et al. |
| 2011/0200520 A1 | 8/2011 | Ramkumar et al. |
| 2016/0017798 A1 | 1/2016 | Younes et al. |
| 2019/0010412 A1 | 1/2019 | Moghtaderi et al. |

FOREIGN PATENT DOCUMENTS

| | | |
|---|---|---|
| EP | 1648817 A | 4/2006 |
| EP | 1914197 A1 | 4/2008 |
| WO | 9943609 A1 | 9/1999 |
| WO | 2008039783 | 4/2008 |
| WO | 2014053587 A1 | 4/2014 |

OTHER PUBLICATIONS

Ahmed, et al., Decomposition of hydrocarbons to hydrogen and Carbon Applied Catalysis A: General 359 (2009) 1-24.

Phalak, et al., High Purity Hydrogen Production with In-Situ Carbon Dioxide and Sulfur Capture in a Single Stage Reactor, William G. Lowrie Department of Chemical and Biomolecular Engineering Final Report, Issue Date: Oct. 31, 2011, 258 pgs.

Ramkumar, Thermodynamic and Experimental Analyses of the Three-Stage Calcium Looping Process, I&EC Research, 2010, 49, 16, 7563-7573.

PROCESS AND MEANS FOR DECOMPOSITION OF SOUR GAS AND HYDROGEN GENERATION

FIELD

This disclosure relates to processes and systems for the production of hydrogen from the decomposition of hydrocarbons, and the in situ removal and capture of carbon and sulfur in solid form.

BACKGROUND

Hydrogen is useful in various hydro-treating processes in the petroleum industry, and also as a nonpolluting fuel for the production of energy in fuel cells. Hydrogen is produced conventionally by water vapor reforming methane; a process which involves reacting methane with water vapor at a high temperature to produce syngas, reacting carbon monoxide with water via the water-gas shift reaction, and removing carbon oxide impurities to produce pure hydrogen. However, water vapor reforming can be a complicated process that produces significant amounts of carbon dioxide.

Water vapor reforming can be further complicated by the presence of sulfur-containing impurities such as hydrogen sulfide, a poisonous and caustic chemical substance, in hydrocarbon feedstocks. For example, hydrogen sulfide can be a significant component of natural gas, a common source of the hydrocarbon methane. If not removed, hydrogen sulfide can damage process equipment and result in emissions of heavily-regulated sulfur oxide pollutants. Hydrocarbons can be treated to remove hydrogen sulfide by physical and chemical absorption; but with significant capital and operating costs. There is a need for improved systems and processes that are capable of efficiently decomposing hydrocarbons containing hydrogen sulfide to produce hydrogen without the problems of harmful sulfur oxide and carbon dioxide emissions.

SUMMARY

A general object of this disclosure is to provide integrated systems and processes for decomposing hydrocarbon feedstocks having hydrocarbons and hydrogen sulfide to produce hydrogen and capture carbon and sulfur in solid form. The systems and processes disclosed here include the use of metal-based sorbents to capture sulfur in solid form.

A sour hydrocarbon feedstock including hydrocarbons and sulfur-containing impurities is supplied along with a metal-based sorbent to a reactor where the sulfur-containing impurities react with the metal-based sorbent to produce sulfur-bearing solids and water vapor. In some embodiments, the sulfur-bearing solids are calcium sulfide. Water vapor from the reaction partially reforms the hydrocarbons to produce hydrogen gas and carbon monoxide gas. Typically, only enough water vapor is produced from the reaction to reform a portion of the hydrocarbons. Remaining hydrocarbons are cracked thermally or in the presence of a catalyst to produce carbon solids and hydrogen gas. The dispersed carbon and sulfur-bearing solids are separated from the gaseous products, and then separated into carbon and sulfur-bearing solid streams. The sulfur-bearing solids are reacted with oxygen in an oxidizing reactor to produce oxidized sulfur-bearing solids. The gaseous products are separated to produce pure hydrogen and carbon monoxide-rich off-gas.

Embodiments disclosed here include methods and systems for generating hydrogen from a sour hydrocarbon feedstock and capturing carbon and sulfur in solid form in situ with a metal-based sorbent. In certain embodiments, a method is provided which includes: providing a sour hydrocarbon feedstock and a metal-based sorbent to a hydrogen production unit having a fuel reactor, the metal-based sorbent having a metal selected from calcium, nickel, iron, and combinations of the same; reacting the sour hydrocarbon feedstock with the metal-based sorbent such that hydrocarbons in the sour hydrocarbon feedstock are partially reformed, hydrogen is produced, and sulfur is captured in sulfur-bearing solids; and cracking remaining hydrocarbons, where the remaining hydrocarbons include hydrocarbons from the sour hydrocarbon feedstock that are not partially reformed, such that a hydrogen-rich syngas and carbon solids are produced.

In some aspects, the method can also include reacting carbon monoxide in the hydrogen-rich syngas with water vapor to produce shifted hydrogen-rich syngas. In some aspects, the step of cracking the remaining hydrocarbons includes cracking the remaining hydrocarbons in the presence of a catalyst. In some aspects, the metal-based sorbent includes calcium oxide. In some embodiments, the method can also include calcining calcium carbonate to produce the metal-based sorbent, where the metal-based sorbent is calcium oxide. In embodiments that include calcining calcium carbonate to produce the metal-based sorbent, the step of calcining calcium carbonate can include introducing hot oxidized sulfur-bearing solids to the calcium carbonate so that heat energy is released and delivered to the calcium carbonate by direct contact with the hot oxidized sulfur-bearing solids. Embodiments that include calcining calcium carbonate to produce the metal-based sorbent can also include separating the hydrogen-rich syngas to obtain carbon monoxide and reacting the carbon monoxide with an oxygen-bearing compound to release heat energy that can be used to calcine the calcium carbonate.

An embodiment of a system for generating hydrogen from a sour hydrocarbon feedstock and capturing sulfur and carbon in solid form in situ with a metal-based sorbent is disclosed. The system can include a hydrogen production unit having a fuel reactor that receives sour hydrocarbon feedstock and a metal-based sorbent from a sour hydrocarbon feedstream and a metal-based sorbent stream respectively. The metal-based sorbent can be include a metal selected from the group consisting of: calcium, nickel, iron, and combinations of the same. In some aspects, the metal-based sorbent can include calcium oxide. In certain aspects, the fuel reactor includes a catalyst and the remaining hydrocarbons are cracked in the presence of the catalyst to produce hydrogen-rich syngas and carbon solids.

The sour hydrocarbon feedstock is reacted with the metal-based sorbent in the fuel reactor such that a portion of the hydrocarbons from the sour hydrocarbon feedstock are reformed, and such that hydrogen, carbon oxides, and sulfur-bearing solids are produced. The hydrocarbons from the sour hydrocarbon feedstock that are not reformed can be cracked such that hydrogen and carbon solids are produced, forming hydrogen-rich syngas. The hydrogen-rich syngas leaves the fuel reactor in a hydrogen-rich syngas stream a sour hydrocarbon feedstream that includes a sour hydrocarbon feedstock, a metal-based sorbent stream that includes a metal-based sorbent, a hydrogen production unit having a fuel reactor that receives sour hydrocarbon feedstock from the sour hydrocarbon feedstream and a metal-based sorbent from the metal-based sorbent stream, and the carbon solids and sulfur-bearing solids are commingled such that together they make up dispersed solids. The dispersed solids leave the fuel reactor and hydrogen production unit in a dispersed solids stream.

The system can include a gas-gas separator that receives hydrogen-rich syngas from the hydrogen-rich syngas stream and that separates the hydrogen-rich syngas to obtain hydrogen and carbon oxide-rich off-gas. The hydrogen-rich syngas and carbon oxide-rich off-gas flow out of the gas-gas separator in a hydrogen stream and a carbon oxide-rich off-gas stream respectively. The system can include a solid-solid separation unit that receives dispersed solids from the dispersed solids stream and that separates the dispersed solids to obtain sulfur-bearing solids and carbon solids, the sulfur-bearing solids and carbon solids leaving the solid-solid separation unit in a sulfur-bearing solids stream and a carbon solids stream respectively. The system can also include an oxidizing reactor that receives oxygen and sulfur-bearing solids from an oxygen-carrying stream and the sulfur-bearing solids stream respectively. The sulfur-bearing solids are reacted with the oxygen in the oxidizing reactor to produce oxidized sulfur-bearing solids, and the oxidized sulfur-bearing solids leave the oxidizing reactor in an oxidized sulfur-bearing solids stream.

In certain aspects, the system can also include a calciner that receives calcium carbonate from a calcium carbonate feedstream, and that calcines the calcium carbonate to produce calcium oxide. In such embodiments, the metal-based sorbent includes calcium oxide from the calciner. In certain embodiments having a calciner that produces calcium oxide by calcining calcium carbonate, oxidized sulfur-bearing solids from the oxidized sulfur-bearing solids stream can be introduced to the calciner to deliver heat energy such that heat energy is released and delivered to the calcium carbonate in the calciner.

An embodiment of a system for generating hydrogen from a sour hydrocarbon feedstock and capturing sulfur and carbon in solid form in situ with a metal-based sorbent is also disclosed. The system includes a hydrogen production unit having a first-stage reactor and a second-stage reactor. The first-stage reactor receives a sour hydrocarbon feedstock and a metal-based sorbent from a sour hydrocarbon feedstream and a metal-based sorbent stream respectively. The metal-based sorbent can be selected from the group consisting of: calcium, nickel, iron, and combinations of the same. In certain aspects, the metal-based sorbent can include calcium oxide. The sour hydrocarbon feedstock includes hydrocarbons and sulfur.

The sour hydrocarbon feedstock is reacted with the metal-based sorbent such that sulfur is removed from the sour hydrocarbon feedstock and captured in sulfur-bearing solids. In the process of reacting the sour hydrocarbon feedstock with the metal-based sorbent a portion of the hydrocarbons in the sour hydrocarbon feedstock are reformed to produce hydrogen and carbon oxides. The sulfur-bearing solids leave the first-stage reactor in a sulfur-bearing solids stream. The hydrogen, carbon oxides, and hydrocarbons that are not reformed leave the first-stage reactor in a sweetened hydrocarbon stream.

A second stage reactor in fluid communication with the first-stage reactor receives hydrogen, carbon oxides, and remaining hydrocarbons from the sweetened hydrocarbon stream. The hydrocarbons that are not reformed in the first-stage reactor are cracked in the second-stage reactor such that carbon solids and hydrogen-rich syngas are produced. In certain aspects, the second-stage reactor includes a catalyst and the remaining hydrocarbons are cracked in the presence of the catalyst to produce hydrogen-rich syngas and carbon solids. The hydrogen-rich syngas flow out of the second-stage reactor in a hydrogen-rich syngas stream, and the carbon solids flow out of the second-stage reactor and the hydrogen production unit in a carbon solids stream.

A gas-gas separator receives and separates the hydrogen-rich syngas from the hydrogen-rich syngas stream to obtain hydrogen and carbon oxide-rich off-gas. The carbon oxide-rich syngas and hydrogen flow out of the gas-gas separator in a carbon oxide-rich off-gas stream and a hydrogen stream respectively.

An oxidizing reactor receives oxygen from an oxygen-carrying feedstream and sulfur-bearing solids from the sulfur-bearing solids stream, and the sulfur-bearing solids are reacted with the oxygen to produce oxidized sulfur-bearing solids. The oxidized sulfur-bearing solids leave the oxidizing reactor in an oxidized sulfur-bearing solids stream.

In some aspects, the system can also include a calciner that receives calcium carbonate from a calcium carbonate feedstream and that calcines the calcium carbonate to produce calcium oxide. The metal-based sorbent can include calcium oxide that is produced by calcining calcium carbonate in the calciner. The calcium oxide produced by calcination leaves the calciner in the metal-based sorbent stream. In certain aspects, the efficiency of the system can be improved by introducing the oxidized sulfur-bearing solids from the oxidized sulfur-bearing solids stream to the calciner such that heat energy delivered to the calcium carbonate in the calciner. In certain aspects, the efficiency of the system can be improved by reacting a portion of the carbon oxide-rich off-gas from the carbon oxide-rich off-gas stream with oxygen from an oxygen-carrying feedstream to release heat in the calciner.

BRIEF DESCRIPTION OF THE DRAWINGS

The embodiments disclosed here will be understood by the following detailed description along with the accompanying drawings. The embodiments in the figures are given as examples; the disclosure is not limited to the content of the illustrations.

DETAILED DESCRIPTION

Figure 1:
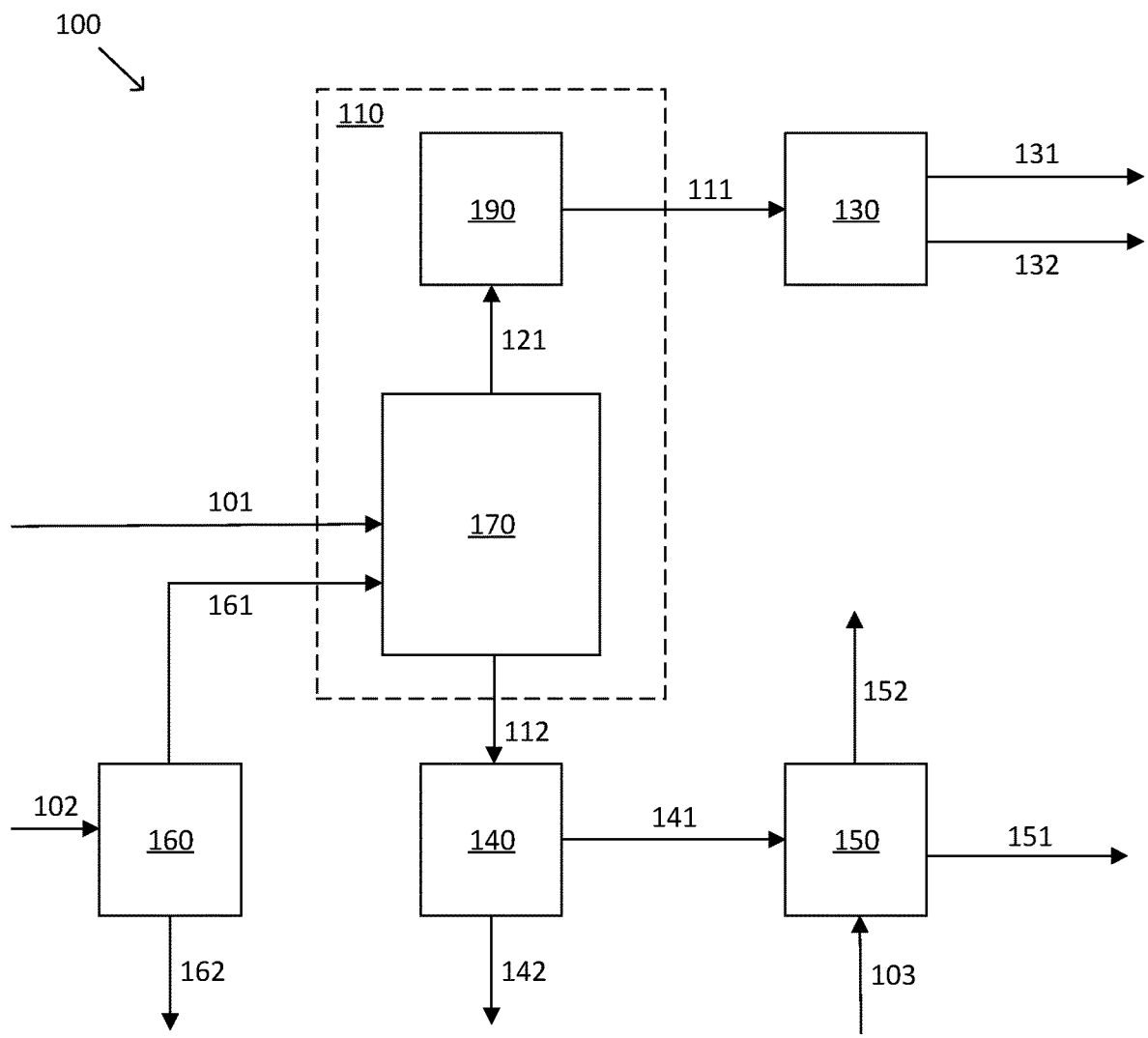
FIG. 1 is a schematic diagram of a system and process for producing hydrogen that uses a single stage to decompose hydrocarbons and capture carbon and sulfur in solid form.

This disclosure describes various embodiments related to processes and systems for decomposing hydrocarbon feedstocks having hydrocarbons and sulfur-containing impurities to produce hydrogen and capture carbon and sulfur in solid form.

For certain embodiments, many details are provided for thorough understanding of the various components or steps. In other instances, well-known processes, devices, compositions, and systems are not described in particular detail so that the embodiments are not obscured by detail. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description and the embodiments it describes are not to be taken in a limiting sense. This disclosure is intended to disclose certain embodiments with the understanding that many other undisclosed changes and modifications can fall within the spirit and scope of the disclosure. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," or "in embodiments," which can each refer to one or more of the same or different embodiments. Furthermore, the terms "comprising," "including," "having," and the like, as used with respect to embodiments of the present disclosure, are synonymous.

In this disclosure and the appended claims, unless otherwise indicated, all numbers expressing quantities, percentages or proportions, and other numerical values used in the specification and claims are to be understood as being modified in all instances by the term "about." The term "about" applies to all numeric values, whether or not explicitly indicated. This term generally refers to a range of numbers that one of ordinary skill in the art would consider a reasonable deviation from the recited numeric values. Generally, values modified by the term "about" include a deviation of ±5% of the given value unless the deviation changes the nature or effect of the value such that it is not operable to achieve its intended purpose.

Ranges can be expressed in this disclosure as from about one particular value and to about another particular value. With these ranges, another embodiment is from the one particular value and/or to the other particular value, along with all combinations within the range. When the range of values is described or referenced in this disclosure, the interval encompasses each intervening value between the upper limit and the lower limit as well as the upper limit and the lower limit and includes smaller ranges of the interval subject to any specific exclusion provided.

Unless otherwise defined, all technical and scientific terms used in this specification and the appended claims have the same meanings as commonly understood by one of ordinary skill in the relevant art.

Where a method having two or more defined steps is recited or referenced in this disclosure or the appended claims, the defined steps can be carried out in any sequence or simultaneously except where the context excludes that possibility.

Hydrocarbon feedstocks sometimes include sulfur-containing impurities such as mercaptans and hydrogen sulfide, a poisonous and caustic chemical substance. For example, hydrogen sulfide can be a significant component of natural gas, a common source of methane. Hydrocarbon feedstocks having significant amounts of sulfur-containing impurities are considered sour hydrocarbons and must be treated to remove the sulfur-containing impurities. For example, natural gas having significant amounts (that is, more than 10 parts per million by volume) of mercaptans and hydrogen sulfide are considered sour gas and must be treated to remove the sulfur-containing impurities. If not removed, sulfur-containing impurities can damage process equipment and result in emissions of heavily-regulated sulfur oxide pollutants. The methods and systems disclosed in this specification are particularly useful for processing natural gas, which can include significant amounts of sulfur-containing impurities.

The systems and processes disclosed in this specification use a metal-based sorbent to react with sulfur-containing impurities and capture sulfur in situ in solid form for safe disposal. The metal-based sorbent includes oxygen and a metal selected from the group consisting of: calcium, iron, nickel, and combinations of the same. In some embodiments, the metal-based sorbent can be calcium oxide or calcium carbonate. Calcium carbonate is readily available in the form of limestone, and calcium oxide can be prepared from calcium carbonate by calcination in a calciner at a temperature above 850° C. Equation 1 shows an example of a simple reaction for producing calcium oxide from calcium carbonate.

$$CaCO_3(s) \rightleftharpoons CaO(s) + CO_2(g) \qquad \text{Eq. 1}$$

Although the reaction shown in Eq. 1 is reversible, complete decomposition of calcium carbonate into calcium oxide and carbon dioxide can be driven by continuous removal of carbon dioxide.

Not intending to be limited by any particular technical theory, when streams having hydrocarbons and sulfur-containing impurities are introduced to a metal-based sorbent, such as calcium oxide, under suitable reaction conditions, sulfur reacts with the metal-based sorbent to produce a sulfur-containing solid. For example, hydrogen sulfide in sour gas reacts with calcium oxide as shown in Eq. 2.

$$CaO(s) + H_2S(g) \rightleftharpoons CaS(s) + H_2O(g) \qquad \text{Eq. 2}$$

Calcium sulfide, a sulfur-bearing compound, can be reacted with oxygen to produce calcium sulfate, an oxidized sulfur-bearing compound, which can be used to produce gypsum, plaster of Paris, stucco, certain paints, ceramics, and paper. Because this reaction is exothermic, energy from reacting a sulfur-bearing compound with oxygen can be recovered and used to provide energy for endothermic reactions in the system.

In addition to capturing sulfur in solid form, the reaction between a metal-based sorbent and sulfur-containing impurities can produce water vapor. For example, Eq. 2 shows that water vapor is a byproduct of the reaction between calcium oxide and hydrogen sulfide. Under appropriate reaction conditions, water vapor from the reaction between the metal-based sorbent and sulfur can partially reform hydrocarbons that are present when the reaction takes place. For example, water vapor can react with methane in natural gas to produce carbon oxides and hydrogen as shown in Eq. 3 and 4.

$$CH_4(g) + H_2O(g) \rightarrow CO(g) + 3H_2(g) \qquad \text{Eq. 3}$$

$$CH_4(g) + 2H_2O(g) \rightarrow CO_2(g) + 4H_2(g) \qquad \text{Eq. 4}$$

As used in this disclosure, the term "partially reform" means to reform only a portion of hydrocarbons, leaving another portion unreformed. The unreformed portion of hydrocarbons is referred to as remaining hydrocarbons in this disclosure. The portion of partially reformed hydrocarbons can be controlled by limiting oxygen available for the production of steam in the reactor. Remaining hydrocarbons can be cracked thermally or in the presence of a catalyst to produce carbon solids and hydrogen. For example, methane can be cracked thermally or in the presence of a catalyst at a temperature in the range of about 500° C. to about 1500° C., preferably in the range of about 750° C. to about 1300° C., to produce carbon solids and hydrogen as shown in Eq. 5.

$$CH_4(g) \rightarrow C(s) + 2H_2(g) \qquad \text{Eq. 5}$$

The energy required to carry out the reaction shown in Eq. 5 is 74.9 kilojoules (kJ) per mole of methane, or only 37.5 kJ per mole of $H_2$, which is significantly less than the energy requirement for water vapor methane reforming which is 68.7 kJ per mole of $H_2$. Because carbon is captured in solid form, carbon dioxide emissions can be reduced significantly without additional treatment.

Carbon solids produced by the thermal or catalytic decomposition of hydrocarbons can be particulates, and in some embodiments the carbon solids can be nanoparticles or have nanostructures in the shape of fibers or tubes. The carbon solids can be pure carbon, or they can be mostly carbon (that is, greater than 80 mole percent (mol %) carbon) with some impurities.

In some embodiments, remaining hydrocarbons can be cracked in the presence of a catalyst. Examples of catalysts include monometallic catalysts having transition and noble metals such as nickel, iron, palladium, cobalt, etc. Other examples of catalysts include bimetallic catalysts having a combination of metals such as copper, iron, nickel, palladium, and other metals. Other examples of catalysts include carbon catalysts such as activated carbon, carbon black, microcrystalline graphites, and nanostructured carbons. Some catalysts can be supported on high surface area ceramic substrates such as $Al_2O_3$ and $SiO_2$, etc. In some embodiments, catalysts that are deactivated can be regenerated using oxygen, water vapor, or carbon dioxide to remove carbon deposits on the surface of the catalyst.

In some embodiments, reactions between the metal-based sorbent and sulfur, and reactions that decompose hydrocarbons are carried out simultaneously in a single stage. For example, the reactions shown in Eq. 1-5 can be carried out simultaneously in the same reactor. In some embodiments, reactions between the metal-based sorbent and sulfur are carried out in one stage and reactions that decompose hydrocarbons into carbon and hydrogen are carried out in another stage; and in some embodiments, both stages can be held in distinct zones in a single reactor. For example, the reactions shown in Eq. 1 and 2 can be carried out in a sweetening zone of a reactor to capture sulfur, and Eq. 3-5 can be carried out in a cracking zone of the reactor to decompose remaining hydrocarbons. In a two-stage configuration with gas-solid separation between stages, sulfur-bearing solids can be captured before they have the opportunity to mix with carbon solids, and vice versa; consequently, solid-solid separation processes to separate carbon solids from sulfur-bearing solids can be avoided.

In the process of decomposing hydrocarbons and capturing carbon and sulfur in solid form, carbon and sulfur-bearing solids can become entrained in gases in the reactor. The entrained solids can be separated from gases in the reactor by gas-solid separation equipment, such as a cyclone, using conventional gas-solid separation techniques. The separated solids are typically dispersed solids including carbon solids and sulfur-bearing solids.

FIG. 1 is a schematic diagram of an embodiment of a system and process for decomposing hydrocarbon feedstocks having hydrocarbons and hydrogen sulfide to produce hydrogen and capture carbon and sulfur in solid form. In this embodiment, the system 100 includes a hydrogen production unit 110 with a single stage where the reactions shown in Eq. 1-5 are carried out simultaneously in fuel reactor 170. A sour hydrocarbon feedstream 101 having a sour hydrocarbon feedstock (that is, hydrocarbons and sulfur-containing impurities), and a metal-based sorbent stream 161 having a metal-based sorbent are introduced to fuel reactor 170 in hydrogen production unit 110. In some embodiments, sour hydrocarbon feedstream 101 includes methane and hydrogen sulfide. In some embodiments, the metal-based sorbent stream 161 includes calcium oxide.

In some embodiments, the metal-based sorbent can be calcium oxide that is prepared from calcium carbonate. In these embodiments, a calcium carbonate feedstream 102 introduces calcium carbonate to calciner 160 where calcium carbonate is calcined at a temperature above 850° C. to produce calcium oxide and carbon dioxide. The calcium oxide can be separated from the carbon dioxide by a gas-solid separation device, such as a cyclone. In this embodiment, the calcium oxide flows out of the calciner 160 in metal-based sorbent stream 161, and carbon dioxide flows out of the calciner 160 in carbon dioxide stream 162.

The hydrocarbons and sulfur-containing impurities from sour hydrocarbon feedstream 101 and the metal-based sorbent from metal-based sorbent stream 161 are reacted at a temperature in the range of about 500° C. to about 1500° C., preferably in the range of about 750° C. to about 1300° C. Heat energy can be provided by combusting fuel in an integrated combustion chamber. In some embodiments, a slip stream of product hydrogen can be combusted to provide heat energy, which can reduce carbon dioxide emissions.

The metal-based sorbent reacts with the sulfur-containing impurities in fuel reactor 170 to produce sulfur-bearing solids and water vapor. In some embodiments, the sulfur containing solids are sulfur-bearing solids. The water vapor partially reforms the hydrocarbons, producing carbon oxides and hydrogen. A person of ordinary skill in the art will appreciate that the oxygen necessary to partially reform the hydrocarbons is provided by the metal-based sorbent, and that air is not needed to partially reform the hydrocarbons. In some embodiments, the fuel reactor 170 can be operated under anoxic conditions, except for oxygen provided by the metal-based sorbent.

Hydrocarbons that are not reacted with water vapor are cracked to produce hydrogen and carbon solids. In some embodiments, hydrocarbons can be cracked thermally without a catalyst. In some embodiments, remaining hydrocarbons are cracked in the presence of a catalyst to produce hydrogen and carbon solids. Gases produced by reactions in the fuel reactor 170 can include hydrogen, carbon oxides (such as carbon monoxide, and carbon dioxide), and water vapor. Small amounts of hydrocarbons (that is, less than about 5 mol %) can be present in the gas produced in fuel reactor 170. The gases produced in fuel reactor 170 leave fuel reactor 170 in a hydrogen-rich syngas stream 121.

In some embodiments, the hydrogen production unit 110 can include a water-gas shift stage 190 for reacting carbon monoxide with water vapor and produce hydrogen and carbon dioxide. In embodiments having a water-gas shift stage, the gases produced in the fuel reactor 170 are delivered to the water-gas shift stage 190 by the hydrogen-rich syngas stream 121. Carbon monoxide in the hydrogen-rich syngas is reacted with water vapor in water-gas shift stage 190 to reduce carbon monoxide and increase hydrogen, thus producing a hydrogen-rich syngas.

The hydrogen-rich syngas leaves the water-gas shift stage 190 and hydrogen production unit 110 in shifted hydrogen-rich syngas stream 111, and is delivered to purification stage 130 by the same. In some embodiments, shifted hydrogen-rich syngas stream 111 includes 80 mol % hydrogen or more. In some embodiments, the shifted hydrogen-rich syngas stream 111 can include small amounts (that is, less than 5 mol %) of water vapor; and in some embodiments, the shifted hydrogen-rich syngas stream 111 can include small amounts (that is, less than 5 mol %) of unconverted hydrocarbons.

The shifted hydrogen-rich syngas stream 111 introduces hydrogen and carbon oxides to purification stage 130. In embodiments not having a water-gas shift stage 190, the hydrogen-rich syngas from the fuel reactor 170 can be sent to the purification stage by hydrogen-rich syngas stream 121. The purification stage separates gases in the hydrogen-rich syngas or hydrogen-rich syngas to produce a hydrogen stream 131 including hydrogen and a carbon oxide-rich off-gas stream 132 including carbon-oxides. Hydrogen stream 131 includes substantially pure hydrogen (that is, greater than 98 mol % hydrogen). Carbon oxide-rich off-gas stream 132 includes carbon oxides. In some embodiments, the carbon oxide-rich off-gas stream 132 includes carbon oxides and hydrogen. In some embodiments, purification stage 130 can be a pressure swing adsorption system. In some embodiments, purification stage 130 can include a gas-separation membrane, such as a polysulfone fiber membrane or polyimide membrane.

In some embodiments, energy can be provided to other process units in the system by oxidizing carbon monoxide from carbon oxide-rich off-gas stream 132. For example, carbon monoxide from carbon oxide-rich off-gas stream 132 can be combusted with oxygen from an oxygen-bearing compound such as calcium sulfate in calciner 160. In some embodiments, carbon monoxide is combusted with air; and in some embodiments, carbon monoxide is combusted with pure oxygen. Combusting carbon monoxide with pure oxygen allows the reactor to be operated in oxy-combustion mode, which is more energy efficient compared with combusting with air because nitrogen is not heated in the process.

In some embodiments, carbon monoxide from carbon oxide-rich off-gas stream 132 can be oxidized with oxygen from oxidized sulfur-bearing solids from other processes. For example, oxidized sulfur-bearing solids from oxidized sulfur-bearing solids stream 151 can be introduced with carbon monoxide from carbon oxide-rich off-gas stream 132 to calciner 160. Oxygen in the oxidized sulfur-bearing solids reacts with carbon monoxide to produce carbon dioxide, heat energy, and sulfur-bearing solids such as calcium sulfide. In this example, carbon dioxide does not mix with nitrogen from air, which facilitates carbon dioxide capture for sequestration or other uses. Carbon dioxide flows out of the calciner 160 in carbon dioxide stream 162.

In some embodiments, carbon oxide-rich off-gas stream 132 can be treated in a water-gas shift unit (not shown) where carbon monoxide reacts with water vapor to form hydrogen and carbon dioxide. The water-gas shift unit can have two reactors in series, with cooling before and between reactors. The reactors can be operated at a temperature in the range of about 150° C. to about 400° C. The reactors can be adiabatic reactors. Hydrogen and carbon dioxide flow out of the water-gas shift unit in a shifted syngas stream (not shown), which can be sent for purification to produce substantially pure hydrogen (that is, greater than 98 mol % hydrogen).

Carbon solids and sulfur-bearing solids flow out of the fuel reactor 170 and hydrogen production unit 110 in dispersed solids stream 112. The solids in dispersed solids stream 112 are dispersed, meaning that they are distributed randomly or mixed. Dispersed solids stream 112 introduces the carbon solids and sulfur-bearing solids to a solid-solid separation unit 140 where carbon solids are separated from sulfur-bearing solids to produce carbon solids stream 142 and sulfur-bearing solids stream 141; here, carbon solids stream 142 includes carbon solids and sulfur-bearing solids stream 141 includes sulfur-bearing solids.

Sulfur-bearing solids stream 141 introduces sulfur-bearing solids to oxidizing reactor 150 where the sulfur-containing solids are reacted with oxygen from oxygen-carrying stream 103 to produce oxidized sulfur-bearing solids. The oxidizing reactor is operated at a temperature in the range of about 600° C. to about 1600° C., preferably in the range of about 800° C. to about 1400° C. In some embodiments, oxygen-carrying stream 103 includes air. Oxidized sulfur-bearing solids flow out of the oxidizing reactor 150 in oxidized sulfur-bearing solids stream 151. In some embodiments, oxidized sulfur-bearing solids can be recycled to the fuel reactor 170 in hydrogen production unit 110 to deliver heat and oxygen for the partial reforming of the hydrocarbons. While oxidized sulfur-bearing solids can be recycled to the hydrogen production unit 110 to deliver heat and oxygen to partially reform the hydrocarbons, advantages, such as minimizing process equipment size and carbon oxide production, can be gained by keeping oxidized sulfur-bearing solids separate from solids in the hydrogen production unit 110. Oxygen-lean stream 152 flows out of the oxidizing reactor 150. In some embodiments, oxygen-lean stream 152 includes oxygen-lean air.

Because the reaction between sulfur-bearing solids and oxygen in oxidizing reactor 150 is exothermic, heat energy from oxidizing reactor 150 can be captured and transferred to other units in the system. For example, heat from oxygen-lean stream 152 can be used to preheat calcium carbonate feedstream 102 or sour hydrocarbon feedstream 101 indirectly through a heat exchanger network. In another example, heat energy can be delivered to calciner 160 by introducing hot oxidized sulfur-bearing solids from oxidized sulfur-bearing solids stream 151 to the calciner 160 so that heat energy is conducted by direct contact with the hot oxidized sulfur-bearing solids. Oxidized sulfur-bearing solids can be separated from other solids by a solid-solid separation unit. In some embodiments, calcium carbonate feedstream 102 is preheated with heat energy from oxygen-lean stream 152 and heat energy is provided to oxidizing reactor 150 by introducing hot oxidized sulfur-bearing solids that flow out of oxidizing reactor 150 to the calciner 160 where heat from hot oxidized sulfur-bearing solids can be conducted by direct contact with calcium carbonate. Heat from any process in the system can also be used to generate water vapor for power and utility purposes.

Figure 2:
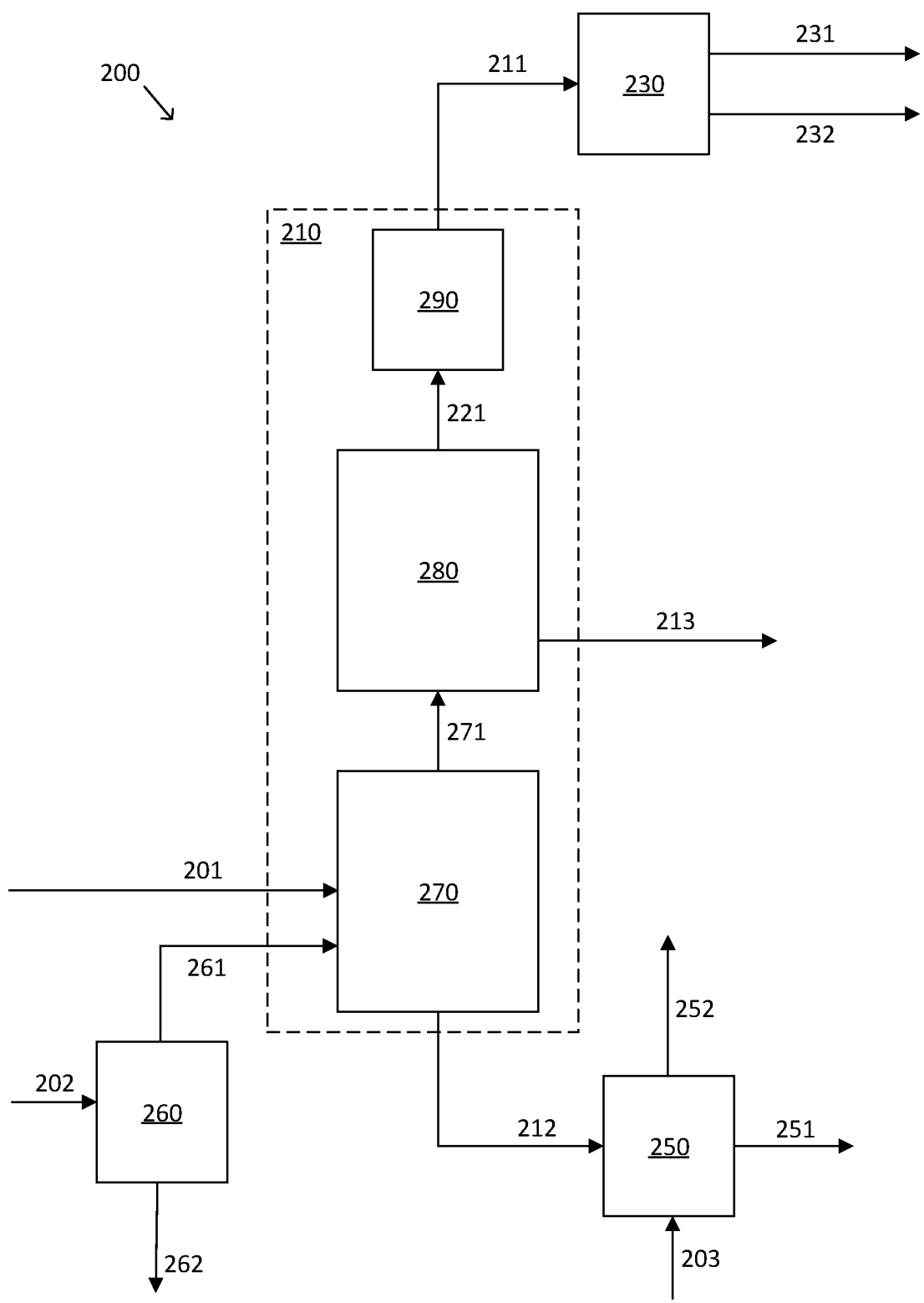
FIG. 2 is a schematic diagram of a system and process for producing hydrogen with a two-stage configuration for decomposing hydrocarbons and capturing carbon and sulfur in solid form.

FIG. 2 is a schematic diagram of a system and process for producing hydrogen with a two-stage configuration for decomposing hydrocarbons and capturing carbon and sulfur in solid form. In this embodiment, sulfur is captured in solid form in a first stage and hydrocarbons are decomposed in a second stage. The system 200 shown in FIG. 2 includes a hydrogen production unit 210, the hydrogen production unit 210 having first- and second-stage reactors 270 and 280 respectively. The reactions shown in Eq. 1 and 2 are carried out in first-stage reactor 270, and the reactions shown in Eq. 3-5 are carried out in second-stage reactor 280. A sour hydrocarbon feedstream 201 having a sour hydrocarbon feedstock (that is, hydrocarbons and hydrogen sulfide) and a metal-based sorbent stream 261 having a metal-based sorbent are introduced to first-stage reactor 270 in hydrogen production unit 210. In some embodiments, sour hydrocarbon feedstream 201 includes natural gas and hydrogen sulfide. In some embodiments, the metal-based sorbent stream 261 includes calcium oxide.

In some embodiments, the metal-based sorbent can be calcium oxide that is prepared from calcium carbonate similar to the process described above. In these embodiments, a calcium carbonate feedstream 202 introduces calcium carbonate to calciner 260. Calcium oxide flows out of the calciner 260 in metal-based sorbent stream 261, and carbon dioxide flows out of the calciner 260 in carbon dioxide stream 262.

The first-stage reactor 270 can be operated at a temperature that is sufficiently high to react sulfur with the metal-based sorbent, but that is sufficiently low so that hydrocarbons are not decomposed in the first-stage reactor 270. In some embodiments, the first-stage reactor 270 can be operated in the range of about 400° C. to about 900° C. Water vapor produced by the reaction between sulfur and the metal-based sorbent can partially reform hydrocarbons present in the first-stage reactor 270, producing hydrogen, and carbon oxides. A person of ordinary skill in the art will appreciate that the oxygen necessary to partially reform the hydrocarbons can be provided by the metal-based sorbent, and that air is not needed to partially reform the hydrocarbons. In some embodiments, only oxygen from the metal-based sorbent is provided for the reactions in the first-stage reactor 270. Remaining hydrocarbons, hydrogen, and carbon oxides flow out of the first-stage reactor 270 in sweetened hydrocarbon stream 271.

Sweetened hydrocarbon stream 271 introduces partially reformed hydrocarbons, hydrogen, and carbon oxides from the first-stage reactor 270 to second-stage reactor 280, where remaining hydrocarbons are cracked to produce hydrogen and carbon solids, and thus produce a hydrogen-rich syngas. Second-stage reactor 280 is operated at a temperature in the range of about 500° C. to about 1500° C., preferably in the range of about 500° C. to about 1300° C., to crack remaining hydrocarbons and produce hydrogen and carbon solids. Reactions in the second-stage reactor 280 can be carried out thermally or in the presence of a catalyst. In some embodiments, the second-stage reactor 280 can be operated under anoxic conditions. The hydrogen-rich syngas produced in the second-stage reactor 280 leaves the second-stage reactor 280 in a hydrogen-rich syngas stream 221. In some embodiments, hydrogen-rich syngas stream 221 includes 80 mol % hydrogen or more. In some embodiments, the hydrogen-rich syngas stream 221 can include small amounts (that is, less than 5 mol %) of water vapor; and in some embodiments, the hydrogen-rich syngas stream 221 can include small amounts (that is, less than 5 mol %) of unconverted hydrocarbons.

Entrained sulfur-bearing solids and metal-based sorbent solids can be separated from gases in the first-stage reactor 270 or second-stage reactor 280 by gas-solid separators (not shown), such as cyclones, in the hydrogen production unit 210. Sulfur-bearing solids produced in the first-stage reactor 270 leave the first-stage reactor 270 and the hydrogen production unit 210 in sulfur-bearing solids stream 212. Carbon solids produced in the second-stage reactor 280 leave the second-stage reactor 280 and hydrogen production unit 210 in carbon solids stream 213.

In some embodiments, the hydrogen production unit 210 can also include a water-gas shift unit 290 where hydrogen-rich syngas from hydrogen-rich syngas stream 221 is reacted with water vapor to reduce carbon monoxide and increase hydrogen content, thus producing a hydrogen-rich syngas. In embodiments having a water-gas shift unit 290, the hydrogen-rich syngas leaves the water-gas shift unit 290 and the hydrogen production unit 210 in shifted hydrogen-rich syngas stream 211. In embodiments that do not have a water-gas shift unit, hydrogen-rich syngas from hydrogen-rich syngas stream 221 can be sent to purification stage 230.

Shifted hydrogen-rich syngas stream 211 or hydrogen-rich syngas stream 221 delivers hydrogen-rich syngas or hydrogen-rich syngas respectively to purification stage 230, where it is separated similar to the process described above to produce a hydrogen stream 231 having hydrogen and a carbon oxide-rich off-gas stream 232 having carbon-oxide rich off-gas. In some embodiments, hydrogen stream 231 has pure hydrogen (that is, 98 mol % hydrogen or more). In some embodiments, energy can be provided to other process units in the system by oxidizing carbon monoxide from carbon oxide-rich off-gas stream 232, similar to the description above.

Sulfur-bearing solids stream 212 introduces sulfur-bearing solids to oxidizing reactor 250 where the sulfur-bearing solids are reacted with oxygen from oxygen-carrying stream 203 similar to the process described above to produce oxidized sulfur-bearing solids. In some embodiments, oxygen-carrying stream 203 includes air. Oxidized sulfur-bearing solids flow out of the oxidizing reactor 250 in oxidized sulfur-bearing solids stream 251. While oxidized sulfur-bearing solids can be recycled to the first-stage reactor 270 to deliver heat and oxygen to partially reform the hydrocarbons, advantages, such as minimizing process equipment size and carbon oxide production, can be gained by keeping oxidized sulfur-bearing solids separate from solids in the first-stage reactor 270. Oxygen-lean stream 252 flows out of the oxidizing reactor 250. In some embodiments, oxygen-lean stream 252 includes oxygen-lean air. Heat energy from oxidizing reactor 250 can be captured and transferred to other units in the system similar to the process described above.

EXAMPLES

The following illustrative examples are intended to be non-limiting.

Example 1

Dual simulations of a system and process as shown in FIG. 1 were performed. The first simulation simulated the system and process with a sour hydrocarbon feedstream 101 having 80.0 mol % methane and 20.0 mol % hydrogen sulfide (high-sulfur feedstock), and the second simulation simulated the system and process with a sour hydrocarbon feedstream having 99.0 mol % methane and 1.0 mol % hydrogen sulfide (low-sulfur feedstock). The sour hydrocarbon feedstream was introduced to a fuel reactor 170 in the hydrogen production unit 110 with calcium oxide which had been prepared by calcining calcium carbonate in calciner 160. The fuel reactor 170 was operated at temperature of 850° C. and pressure of 1 bar. In both simulations all of the hydrogen sulfide in the sour hydrocarbon feedstream was converted to calcium sulfide, a sulfur-bearing compound, in fuel reactor 170. The compositions of the shifted hydrogen-rich syngas stream 111 flowing out of the hydrogen production unit 110 in both simulations are provided in Table 1.

TABLE 1

Simulated compositions of shifted hydrogen-rich syngas streams produced by a hydrogen production unit in a system as shown in FIG. 1. The first composition is from a simulation of a system and process for treating a sour hydrocarbon feedstream having 80.0 mol % methane and 20.0 mol % hydrogen sulfide (High $H_2S$ Feedstock); and the second composition is from a simulation of a system and process for treating a sour hydrocarbon feedstream having 99.0 mol % methane and 1.0 mol % hydrogen sulfide (Low $H_2S$ Feedstock).

| Components, mole fraction | High $H_2S$ Feedstock | Low $H_2S$ Feedstock |
|---|---|---|
| Methane ($CH_4$) | 0.018 | 0.024 |
| Hydrogen ($H_2$) | 0.858 | 0.947 |
| Carbon monoxide (CO) | 0.016 | 0.001 |
| Carbon dioxide ($CO_2$) | 0.070 | 0.004 |
| Water ($H_2O$) | 0.038 | 0.024 |
| Hydrogen sulfide ($H_2S$) | 0.000 | 0.000 |

The shifted hydrogen-rich syngas stream was sent to purification stage 130 to separate and produce a hydrogen stream 131 and a carbon oxide-rich off-gas stream 132. The ratios of hydrogen ($H_2$) in hydrogen stream 131 to the high-sulfur feedstock and the low-sulfur feedstock are 0.953 and 1.155 respectively. The ratios of hydrogen in hydrogen stream 131 to methane in the high-sulfur feedstock and the low-sulfur feedstock are 1.191 and 1.177 respectively. The ratios of hydrogen in hydrogen stream 131 to hydrogen content in the high-sulfur feedstock and the low-sulfur feedstock are 0.471 and 0.565 respectively. Surprisingly, these ratios show that a significant amount of hydrogen can be produced this system and process even with high sulfur content.

Sulfur-bearing solids including calcium sulfide and carbon solids flowed out of the fuel reactor 170 in dispersed solids stream 112. In the high-sulfur feedstock simulation, dispersed solids stream 112 had 25.9 mol % sulfur-bearing solids and 74.1 mol % carbon solids. In the low-sulfur feedstock simulation, dispersed solids stream 112 has 1.1 mol % sulfur-bearing solids and 98.9 mol % carbon solids. A significant reduction in carbon dioxide emissions was achieved in both the high- and low-sulfur feedstock simulations, 77.4% and 94.2% respectively, compared with possible carbon dioxide emissions. The 77.4% and 94.2% reduction of carbon dioxide emissions in the high- and low-sulfur feedstock simulations accounts for carbon dioxide produced in the production of calcium oxide from calcium carbonate.

Example 2

A simulation of a system and process as shown in FIG. 1 was performed. The simulation included a sour hydrocarbon feedstream 101 having 80.00 mol % methane and 20.00 mol % hydrogen sulfide, with a feed rate of 18.0 kilomoles (kmol) per hour and a temperature of 798° C. The sour hydrocarbon feedstream was introduced to the fuel reactor 170 in the hydrogen production unit 110 with a metal-based sorbent, calcium oxide, from metal-based sorbent stream 161. The fuel reactor 170 was operated at a temperature of 850° C. and a pressure of 1 bar. In this example, gases produced in the fuel reactor 170 were reacted with 4.0 kmol per hour of water vapor in a water-gas shift stage 190 having two adiabatic reactors with inlet temperatures of 350° C. and 200° C. to reduce carbon monoxide and produce carbon monoxide and hydrogen. All of the hydrogen sulfide in the sour hydrocarbon feedstream 101 was converted to calcium sulfide and water vapor in the fuel reactor 170. Entrained sulfur-bearing solids and carbon solids were separated from gases in the hydrogen production unit 110 by a cyclone (not shown).

A stream of 100 mol % calcium carbonate with a feed rate of 3.6 kmol per hour and a temperature of 450° C. was calcined in calciner 160 to produce calcium oxide and carbon dioxide. A cyclone separated solids from the carbon dioxide produced in the calciner 160. Calcium oxide flowed out of the calciner in metal-based sorbent stream 161, and carbon dioxide flowed out of the calciner 160 in carbon dioxide stream 162; the two streams included calcium oxide and carbon dioxide respectively. The calciner produced carbon dioxide at a rate of 3.6 kmol per hour and a temperature of 900° C.

Sulfur-bearing solids including calcium sulfide and carbon solids flowed out of the fuel reactor 170 and hydrogen production unit 110 in dispersed solids stream 112 at a rate of 13.9 kmol per hour and a temperature of 850° C., and the dispersed solids contained 74.14 mol % carbon and 25.85 mol % calcium sulfide. Carbon solids and sulfur-bearing solids from dispersed solids stream 112 were introduced to solid-solid separation unit 140 where they were separated. Carbon solids flowed out of the solid-solid separation unit 140 in carbon solids stream 142, and sulfur-bearing solids flowed out of the solid-solid separation unit 140 in sulfur-bearing solids stream 141.

Sulfur-bearing solids including calcium sulfide from sulfur-bearing solids stream 141 were introduced to oxidizing reactor 150 where they were reacted with air to produce oxygen-lean air and oxidized sulfur-bearing solids having calcium sulfate. Oxygen-lean air flowed out of the oxidizing reactor 150 at a rate of 27.8 kmol per hour and a temperature of 1000° C., and contained 99.46 mol % nitrogen and 0.54 mol % oxygen.

The system and process produced 17.1 kmol per hour of 100 mol % hydrogen at 30° C., which flowed out of purification stage 130 in hydrogen stream 131. In purification stage 130 water is removed from the shifted hydrogen-rich syngas stream 111 at a rate of 9.75 kmol per hour, and a portion of hydrogen (1.45 kmol per hour) is used in the separation process. Table 2 shows the temperature, flowrate, and molar composition of the sour hydrocarbon feedstock in sour hydrocarbon feedstream 101 that was introduced to the fuel reactor 170 in hydrogen production unit 110, the gas produced by reactions in the fuel reactor 170 was treated in a water-gas shift stage 190 to reduce carbon-oxides and produce a hydrogen-rich syngas. The hydrogen rich syngas left the water-gas shift stage 190 and hydrogen production unit 110 in shifted hydrogen-rich syngas stream 111, and was delivered to the purification stage 130. The hydrogen-rich syngas from shifted hydrogen-rich syngas stream 111 was separated to obtain hydrogen and carbon oxide-rich off-gas. The hydrogen and carbon oxide-rich off-gas left the purification stage 130 in hydrogen stream 131 and carbon oxide-rich off-gas stream 132.

TABLE 2

This table shows temperatures, flow rates, and molar compositions of certain streams from a simulation of a process and system, as shown in FIG. 1, for producing hydrogen and capturing carbon and sulfur in solid form. The streams characterized here include shifted hydrogen-rich syngas stream 111, and carbon oxide-rich off-gas stream 132.

|  | Hydrogen-rich syngas stream 111 | Carbon oxide-rich off-gas stream 132 |
|---|---|---|
| Temperature, ° C. | 235 | 1000 |
| Flow rate, kmol/hr | 39.1 | 10.8 |
| Hydrogen sulfide ($H_2S$)* | 0.0000 | 0.0000 |
| Carbon dioxide ($CO_2$)* | 0.0703 | 0.2536 |
| Hydrogen ($H_2$)* | 0.8575 | 0.6186 |
| Water ($H_2O$)* | 0.0381 | 0.0049 |
| Methane ($CH_4$)* | 0.0182 | 0.0656 |
| Carbon monoxide (CO)* | 0.0159 | 0.0572 |

*components shown in mole fractions

Not including carbon dioxide produced from the calcination of calcium carbonate and which can be captured for sequestration or other uses, the system and process in this example produces carbon oxides at a rate of 3.6 kmol per hour. Compared with a possible carbon oxide production rate of 14.4 kmol per hour, the system and process reduces carbon oxide emissions by 75.0 mol %.

Example 3

Three simulations of a system and process as shown in FIG. 1 were performed with a sour hydrocarbon feedstream 101 having 80.0 mol % methane and 20.0 mol % hydrogen sulfide. In each of the simulations, 18.0 kmol per hour of hydrocarbon feedstock was supplied to the system and process. Calcium oxide was the metal-based sorbent in one simulation, calcium carbonate was the metal-based sorbent in another, and the remaining simulation did not use a metal-based sorbent.

In the simulation using calcium oxide as the metal-based sorbent, calcium oxide was prepared from calcium carbonate in calciner 160 similar to the process described above at rate of 3.6 kmol per hour.

In each of the simulations, the sour hydrocarbon feedstream 101 introduced methane and hydrogen sulfide to the fuel reactor 170 in the hydrogen production unit 110. In those simulations where a metal-based sorbent stream was used, the metal-based sorbent stream 161 introduced the metal-based sorbent to the fuel reactor 170. In each of the simulations, the fuel reactor 170 in the hydrogen production unit 110 was operated at a temperature of 850° C. and a pressure of 1 bar. In simulations using a metal-based sorbent, the hydrogen sulfide was reacted with the metal-based sorbent, reducing 100 mol % of hydrogen sulfide to zero and capturing sulfur in sulfur-bearing solids having calcium sulfide. The hydrocarbons in each of the simulations were partially reformed and cracked to produce hydrogen, carbon, and carbon oxides.

The hydrogen-rich syngas produced in the simulations using metal-based sorbents were treated in a water-gas shift stage to reduce carbon monoxide and produce hydrogen and carbon dioxide. For the simulation using calcium oxide as a metal-based sorbent, 4.0 kmol per hour of water vapor was used; and for the simulation using calcium carbonate, 10.0 kmol per hour of water vapor was used. The water-gas shift reaction was not necessary in the simulation that did not use a metal-based sorbent because no carbon monoxide was produced. Details about the hydrogen-rich syngas produced in the hydrogen production unit 110 from each of the simulations are provided in Table 3(A). Table 3(B) shows flowrates and compositions of dispersed solids produced in fuel reactor 170 in the hydrogen production unit 110 in each of the simulations.

TABLE 3(A)

Hydrogen-rich syngas flow rates and compositions produced from a sour hydrocarbon feedstock in simulations of the system and process shown in FIG. 1. Two streams use a metal-based sorbent, and are treated in a water-gas shift reactor to reduce carbon monoxide and produce hydrogen and carbon monoxide. The third stream does not use a metal-based sorbent and is not treated in a water-gas shift reactor.

|  | Calcium oxide as metal-based sorbent | Calcium carbonate as metal-based sorbent | No metal-based sorbent |
|---|---|---|---|
| Hydrogen-rich syngas flow rate, kmol/hr | 39.1 | 51.9 | 31.8 |
| Water-gas shift water vapor flow rate, kmol/hr | 4.0 | 10.0 | — |
| Methane ($CH_4$)* | 0.018 | 0.011 | 0.020 |
| Hydrogen ($H_2$)* | 0.855 | 0.748 | 0.867 |
| Carbon monoxide (CO)* | 0.019 | 0.034 | 0.000 |
| Carbon dioxide ($CO_2$)* | 0.068 | 0.160 | 0.000 |
| Water ($H_2O$)* | 0.041 | 0.045 | 0.000 |
| Hydrogen sulfide ($H_2S$)* | 0.000 | 0.000 | 0.113 |

*components shown in mole fractions.

TABLE 3(B)

Dispersed solids produced from a sour hydrocarbon feedstock in simulations of the system and process shown in FIG. 1. Two streams use a metal-based sorbent, and are treated in a water-gas shift reactor to reduce carbon monoxide and produce hydrogen and carbon monoxide. The third stream does not use a metal-based sorbent and is not treated in a water-gas shift reactor.

|  | Calcium oxide as metal-based sorbent | Calcium carbonate as metal-based sorbent | No metal-based sorbent |
|---|---|---|---|
| Dispersed solids flow rate, kmol/hr | 13.9 | 10.9 | 13.8 |
| Calcium carbonate ($CaCO_3$)* | 0.000 | 0.000 | 0.000 |
| Calcium oxide (CaO)* | 0.000 | 0.000 | 0.000 |
| Calcium sulfide (CaS)* | 0.259 | 0.330 | 0.000 |
| Calcium sulfate ($CaSO_4$)* | 0.000 | 0.000 | 0.000 |
| Carbon (C)* | 0.741 | 0.670 | 1.000 |

*components shown in mole fractions.

As shown in Table 3(A), hydrogen sulfide was reduced to zero in both processes where a metal-based sorbent was used. The process using calcium oxide produced 33.4 kmol per hour of hydrogen, the process using calcium carbonate produced 38.9 kmol per hour, and the process with no metal-based sorbent produced 27.5 kmol per hour. The process using calcium carbonate as a metal-based sorbent produced more hydrogen than the process using calcium oxide as a metal-based sorbent, which can be attributed to hydrogen produced from the water-gas shift reaction.

A higher percentage of hydrogen was produced in the processes using a metal-based sorbent than the process that did not use a metal-based sorbent. For example, the processes using calcium oxide and calcium carbonate as a metal-based sorbent converted 91.7% and 91.6% of the hydrogen fed to the system into product hydrogen respectively, while the process that did not use a metal-based sorbent converted only 85.0%. While 21.0% of the hydrogen produced in the process using calcium carbonate as a metal-based sorbent was produced by the water-gas shift reaction, only 7.9% of the hydrogen produced using calcium oxide as a metal-based sorbent was produced by the water-gas shift reaction.

The process using calcium oxide produced 3.4 kmol per hour of carbon oxides, which is a 54% reduction from the flow rate of carbon oxides from the process using calcium carbonate, 7.5 kmol per hour. As shown in Tables 3(A) and 3(B), the process with no metal-based sorbent converted all carbon to solid carbon, but was unable to reduce hydrogen sulfide to suitable levels. The process using calcium oxide converted 10.3 kmol per hour of carbon into solid carbon from a possible 14.4 kmol per hour of carbon from methane in the sour hydrocarbon feedstream; or 71.5% of carbon conversion of carbon into carbon solids. The process using calcium carbonate converted 7.3 kmol per hour of carbon into solid carbon from a possible 18 kmol per hour of carbon from methane in the sour hydrocarbon feedstream and the calcium carbonate; or 40.6% conversion of carbon into carbon solids.

Example 4

Three simulations of a system and process as shown in FIG. 1 were performed with a sour hydrocarbon feedstream 101 having 99.0 mol % methane and 1.0 mol % hydrogen sulfide. In each of the simulations, 18.0 kmol per hour of hydrocarbon feedstock was supplied to the system and process. Calcium oxide was the metal-based sorbent in one simulation, calcium carbonate was the metal-based sorbent in another, and the remaining simulation did not use a metal-based sorbent.

In the simulation using calcium oxide as the metal-based sorbent, calcium oxide was prepared from calcium carbonate in calciner 160 similar to the process described above at rate of 0.18 kmol per hour.

In each of the simulations, the sour hydrocarbon feedstream 101 introduced methane and hydrogen sulfide to the fuel reactor 170 in the hydrogen production unit 110. In those simulations using a metal-based sorbent, the metal-based sorbent stream 161 introduced the metal-based sorbent to the fuel reactor 170. In each of the simulations, the fuel reactor 170 was operated at a temperature of 850° C. and a pressure of 1 bar. The hydrogen sulfide was reacted with the metal-based sorbent in the simulations using a metal-based sorbent, reducing 100 mol % of hydrogen sulfide to zero and capturing sulfur in calcium sulfide. The hydrocarbons in each of the simulations were partially reformed and cracked to produce hydrogen, carbon, and carbon oxides.

The hydrogen-rich syngas produced in the simulations using metal-based sorbents was treated in a water-gas shift stage to reduce carbon monoxide and produce hydrogen and carbon dioxide. In both simulations, 2.0 kmol per hour of water vapor was used. The water-gas shift reaction was not used in the simulation that did not use a metal-based sorbent because no carbon monoxide was produced. Details about the hydrogen-rich syngas produced in the hydrogen production unit 110 from each of the simulations are provided in Table 4(A). Table 4(B) shows flowrates and compositions of dispersed solids produced in the fuel reactor 170 of hydrogen production unit 110.

TABLE 4(A)

Hydrogen-rich syngas flow rates and compositions produced from a sour hydrocarbon feedstock in simulations of the system and process shown in FIG. 1. Two streams use a metal-based sorbent, and are treated in a water-gas shift reactor to reduce carbon monoxide and produce hydrogen and carbon monoxide. The third stream does not use a metal-based sorbent and is not treated in a water-gas shift reactor.

|  | Calcium oxide as metal-based sorbent | Calcium carbonate as metal-based sorbent | No metal-based sorbent |
|---|---|---|---|
| Hydrogen-rich syngas flow rate, kmol/hr | 37.1 | 37.5 | 35.0 |
| Water-gas shift water vapor flow rate, kmol/hr | 2.0 | 2.0 | — |
| Methane ($CH_4$)* | 0.023 | 0.023 | 0.025 |
| Hydrogen ($H_2$)* | 0.921 | 0.920 | 0.970 |
| Carbon monoxide (CO)* | 0.001 | 0.003 | 0.000 |
| Carbon dioxide ($CO_2$)* | 0.004 | 0.011 | 0.000 |
| Water ($H_2O$)* | 0.051 | 0.044 | 0.000 |
| Hydrogen sulfide ($H_2S$)* | 0.000 | 0.000 | 0.005 |

*components shown in mole fractions.

TABLE 4(B)

Dispersed solids produced from a sour hydrocarbon feedstock in simulations of the system and process shown in FIG. 1. Two streams use a metal-based sorbent, and are treated in a water-gas shift reactor to reduce carbon monoxide and produce hydrogen and carbon monoxide. The third stream does not use a metal-based sorbent and is not treated in a water-gas shift reactor.

|  | Calcium oxide as metal-based sorbent | Calcium carbonate as metal-based sorbent | No metal-based sorbent |
|---|---|---|---|
| Dispersed solids flow rate, kmol/hr | 17.0 | 16.8 | 13.8 |
| Calcium carbonate ($CaCO_3$)* | 0.000 | 0.000 | 0.000 |
| Calcium oxide (CaO)* | 0.000 | 0.000 | 0.000 |
| Calcium sulfide (CaS)* | 0.011 | 0.011 | 0.000 |
| Calcium sulfate ($CaSO_4$)* | 0.000 | 0.000 | 0.000 |
| Carbon (C)* | 0.989 | 0.989 | 1.000 |

*components shown in mole fractions.

As shown in Table 4(A), hydrogen sulfide was reduced to zero from the sour hydrocarbon feedstock in the processes using calcium oxide and calcium carbonate as a metal-based sorbent. The process using calcium oxide produced 34.2 kmol per hour of hydrogen, the process using calcium carbonate produced 34.5 kmol per hour, and the process with no metal-based sorbent produced 33.9 kmol per hour. The process using calcium carbonate as a metal-based sorbent produced slightly more hydrogen than the process using calcium oxide as a metal-based sorbent which can be attributed to hydrogen produced from the water-gas shift reaction.

The processes using calcium oxide and calcium carbonate as a metal-based sorbent converted 90.4% and 91.1% of the hydrogen fed to the system into product hydrogen respectively; the process that did not use a metal-based sorbent converted 94.7%. Surprisingly, the percentage of hydrogen product produced was slightly higher in the related examples described in Example 3 above with a high-sulfur hydrocarbon feedstock than these examples using a low-sulfur hydrocarbon feedstock. For example, the process using calcium oxide produced 91.7% of hydrogen fed to the system with a high-sulfur hydrocarbon feedstock, while 90.4% of hydrogen was produced using a low-sulfur hydrocarbon feedstock. Similarly, 91.6% of hydrogen fed to the system was produced using calcium carbonate as a metal-based sorbent with a high-sulfur hydrocarbon feedstock, while 91.1% of hydrogen was produced from a low-sulfur hydrocarbon feedstock.

Similar to the results described in Example 3, the process using calcium carbonate produced a higher percentage of hydrogen by the water-gas shift reaction. Specifically, 1.1% of the hydrogen produced in the process using calcium carbonate as a metal-based sorbent was produced by the water-gas shift reaction, only 0.4% of the hydrogen produced using calcium oxide as a metal-based sorbent was produced by the water-gas shift reaction.

The process using calcium carbonate produced 0.5 kmol per hour of carbon oxides, and the process using calcium oxide produced only 0.19 kmol per hour of carbon oxides. As shown in Tables 4(A) and 4(B), the process with no metal-based sorbent converted all carbon to solid carbon, but was unable to reduce hydrogen sulfide to suitable levels. The process using calcium carbonate produced 16.8 kmol per hour of carbon solids from a possible 18.0 kmol per hour of carbon from methane in the sour hydrocarbon feedstream and the calcium carbonate; that is, 93.3% of carbon introduced to the fuel reactor 170 was captured in carbon solids. The process using calcium oxide as a metal-based sorbent produced 17.0 kmol per hour of carbon solids from a possible 18.0 kmol per hour of carbon from methane in the sour hydrocarbon feedstream and the calcium carbonate used to produce calcium oxide; that is, 94.4% of carbon introduced to the fuel reactor 170 and calciner 160 was captured in carbon solids.

We claim:

1. A method for generating hydrogen from a sour hydrocarbon feedstock and capturing carbon and sulfur in solid form in situ with a metal-based sorbent, the method comprising:
    providing a sour hydrocarbon feedstock and a metal-based sorbent to a hydrogen production unit comprising a fuel reactor, wherein the metal-based sorbent comprises a metal selected from the group consisting of: calcium, nickel, iron, and combinations of the same;
    reacting the sour hydrocarbon feedstock with the metal-based sorbent such that hydrocarbons in the sour hydrocarbon feedstock are partially reformed, hydrogen is produced, and sulfur is captured in sulfur-bearing solids; and
    cracking remaining hydrocarbons, wherein the remaining hydrocarbons comprise hydrocarbons from the sour hydrocarbon feedstock that are not partially reformed, such that a hydrogen-rich syngas and carbon solids are produced.

2. The method of claim 1, further comprising a step of reacting carbon monoxide in the hydrogen-rich syngas with water vapor to produce shifted hydrogen-rich syngas.

3. The method of claim 1, wherein the step of cracking the remaining hydrocarbons includes cracking the remaining hydrocarbons in the presence of a catalyst.

4. The method of claim 1, wherein the metal-based sorbent comprises calcium oxide.

5. The method of claim 1, further comprising a step of calcining calcium carbonate such that calcium oxide is produced, and wherein the metal-based sorbent comprises calcium oxide.

6. The method of claim 5, wherein the step of calcining calcium carbonate includes introducing hot oxidized sulfur-bearing solids to the calcium carbonate such that heat energy is released and delivered to the calcium carbonate by direct contact with the hot oxidized sulfur-bearing solids.

7. The method of claim 5, further comprising the step of separating the hydrogen-rich syngas to obtain carbon monoxide; and
    wherein the step of calcining the calcium carbonate includes reacting the carbon monoxide with an oxygen-bearing compound such that heat energy is released and delivered to the calcium carbonate.

8. A system for generating hydrogen from a sour hydrocarbon feedstock and capturing sulfur and carbon in solid form in situ with a metal-based sorbent, the system comprising:
    a sour hydrocarbon feedstream comprising sour hydrocarbon feedstock, and a metal-based sorbent stream comprising a metal-based sorbent, wherein the sour hydrocarbon feedstock comprises hydrocarbons and sulfur, and wherein the metal-based sorbent comprises a metal selected from the group consisting of: calcium, nickel, iron, and combinations of the same;
    a hydrogen production unit comprising a fuel reactor that receives sour hydrocarbon feedstock from the sour hydrocarbon feedstream and metal-based sorbent from the metal-based sorbent stream; and
    wherein the sour hydrocarbon feedstock is reacted with the metal-based sorbent such that a portion of the hydrocarbons from the sour hydrocarbon feedstock are reformed, and such that hydrogen, carbon oxides, and sulfur-bearing solids are produced, and wherein hydrocarbons from the sour hydrocarbon feedstock that are not reformed are cracked such that hydrogen and carbon solids are produced, and wherein hydrogen and carbon oxides together form a hydrogen-rich syngas that leaves the fuel reactor in a hydrogen-rich syngas stream, and wherein carbon solids and sulfur-bearing solids are commingled such that together they make up a dispersed solids, and wherein the dispersed solids leave the fuel reactor and hydrogen production unit in a dispersed solids stream;
    a gas-gas separator that receives hydrogen-rich syngas from the hydrogen-rich syngas stream, and wherein the hydrogen-rich syngas is separated to obtain hydrogen and carbon oxide-rich off-gas, the hydrogen-rich syngas and carbon oxide-rich off-gas flowing out of the gas-gas separator in a hydrogen stream and a carbon oxide-rich off-gas stream respectively;
    a solid-solid separation unit that receives dispersed solids from the dispersed solids stream, and that separates the dispersed solids to obtain sulfur-bearing solids and carbon solids, wherein the sulfur-bearing solids and carbon solids leave the solid-solid separation unit in a sulfur-bearing solids stream and a carbon solids stream respectively;
    an oxidizing reactor that receives oxygen from an oxygen-carrying feedstream and sulfur-bearing solids from the sulfur-bearing solids stream, and in which oxygen is reacted with sulfur-bearing solids to produce oxidized sulfur-bearing solids; and wherein the oxidized sulfur-bearing solids leave the oxidizing reactor in an oxidized sulfur-bearing solids stream.

9. The system of claim 8, wherein the metal-based sorbent comprises calcium oxide.

10. The system of claim 8, wherein the fuel reactor comprises a catalyst and wherein the remaining hydrocarbons are cracked in the presence of the catalyst to produce hydrogen-rich syngas and carbon solids.

11. The system of claim 8, further comprising a calcium carbonate feedstream comprising calcium carbonate, and a calciner in which calcium carbonate from the calcium carbonate stream is introduced and calcined such that calcium oxide is produced; wherein the metal-based sorbent stream comprises calcium oxide from the calciner, and wherein the metal-based sorbent comprises calcium oxide.

12. The system of claim 11, wherein oxidized sulfur-bearing solids from the oxidized sulfur-bearing solids stream are introduced to the calciner to deliver heat energy such that heat energy is released and delivered to the calcium carbonate in the calciner.

13. The system of claim 11, wherein oxygen from an oxygen-carrying feedstream and a portion of the carbon oxide-rich off-gas from the carbon oxide-rich off-gas stream are introduced to the calciner and reacted such that heat energy is released and delivered to the calcium carbonate in the calciner.

14. A system for generating hydrogen from a sour hydrocarbon feedstock and capturing sulfur and carbon in solid form in situ with a metal-based sorbent, the system comprising:
   a sour hydrocarbon feedstream comprising sour hydrocarbon feedstock, the sour hydrocarbon feedstock comprising hydrocarbons and sulfur and a metal-based sorbent stream comprising a metal-based sorbent selected from the group consisting of: calcium, nickel, iron, and combinations of the same;
   a hydrogen production unit comprising a first-stage reactor and a second-stage reactor, wherein the first-stage reactor receives sour hydrocarbon feedstock from the sour hydrocarbon feedstream and metal-based sorbent from the metal-based sorbent stream, wherein the sour hydrocarbon feedstock comprises hydrocarbons and sulfur; wherein the sour hydrocarbon feedstock is reacted with the metal-based sorbent such that sulfur is removed from the sour hydrocarbon feedstock and captured in sulfur-bearing solids, and such that a portion of the hydrocarbons in the sour hydrocarbon feedstock are reformed to produce hydrogen and carbon oxides; wherein the sulfur-bearing solids leave the first-stage reactor in a sulfur-bearing solids stream and the hydrogen, carbon oxides, and hydrocarbons that are not reformed leave the first-stage reactor in a sweetened hydrocarbon stream; and
   a second-stage reactor in fluid communication with the first-stage reactor that receives hydrogen, carbon oxides, and remaining hydrocarbons from the sweetened hydrocarbon stream and wherein the hydrocarbons that are not reformed are cracked such that carbon solids and hydrogen-rich syngas are produced; the hydrogen-rich syngas flowing out of the second-stage reactor in a hydrogen-rich syngas stream, and the carbon solids flowing out of the second-stage reactor and the hydrogen production unit in a carbon solids stream;
   a gas-gas separator that receives hydrogen-rich syngas from the hydrogen-rich syngas stream, and wherein the hydrogen-rich syngas is separated into hydrogen and carbon oxide-rich off-gas, the hydrogen and carbon oxide-rich off-gas flowing out of the gas-gas separator in a hydrogen stream and a carbon oxide-rich off-gas stream respectively;
   an oxidizing reactor that receives oxygen from an oxygen-carrying feedstream and sulfur-bearing solids from the sulfur-bearing solids stream, and in which oxygen is reacted with sulfur-bearing solids to produce oxidized sulfur-bearing solids; and wherein the oxidized sulfur-bearing solids leave the oxidizing reactor in an oxidized sulfur-bearing solids stream.

15. The system of claim 14, wherein the metal-based sorbent comprises calcium oxide.

16. The system of claim 14, wherein the second-stage reactor comprises a catalyst and wherein the remaining hydrocarbons are cracked in the presence of the catalyst to produce hydrogen-rich syngas and carbon solids.

17. The system of claim 14, further comprising a calcium carbonate feedstream comprising calcium carbonate, and a calciner in which calcium carbonate from the calcium carbonate stream is introduced and calcined to produce calcium oxide;
   wherein the metal-based sorbent comprises calcium oxide, and wherein calcium oxide flows out of the calciner in the metal-based sorbent stream.

18. The system of claim 17, wherein oxidized sulfur-bearing solids from the oxidized sulfur-bearing solids stream are introduced to the calciner such that heat energy is released and delivered to the calcium carbonate in the calciner.

19. The system of claim 17, wherein oxygen from an oxygen-carrying feedstream and a portion of the carbon oxide-rich off-gas from the carbon oxide-rich off-gas stream are introduced to the calciner and reacted such that heat energy is released and delivered to the calcium carbonate in the calciner.

* * * * *